US012598103B2

(12) United States Patent
Foresi et al.

(10) Patent No.: US 12,598,103 B2
(45) Date of Patent: Apr. 7, 2026

(54) NETWORK RESOURCE MANAGEMENT

(71) Applicant: Telecom Italia S.p.A., Milan (IT)

(72) Inventors: Bruno Foresi, Turin (IT); Pia Maria Maccario, Turin (IT)

(73) Assignee: TELECOM ITALIA S.P.A., Milan (IT)

( * ) Notice: Subject to any disclaimer, the term of this patent is extended or adjusted under 35 U.S.C. 154(b) by 90 days.

(21) Appl. No.: 18/696,365

(22) PCT Filed: Sep. 30, 2022

(86) PCT No.: PCT/EP2022/077274
§ 371 (c)(1),
(2) Date: Mar. 28, 2024

(87) PCT Pub. No.: WO2023/052583
PCT Pub. Date: Apr. 6, 2023

(65) Prior Publication Data
US 2024/0406054 A1      Dec. 5, 2024

(30) Foreign Application Priority Data

Oct. 1, 2021      (IT) ......................... 102021000025217

(51) Int. Cl.
H04L 41/045          (2022.01)
H04L 12/28          (2006.01)
(Continued)

(52) U.S. Cl.
CPC ........ H04L 41/045 (2022.05); H04L 12/2898 (2013.01); H04L 41/046 (2013.01); H04L 41/5067 (2013.01)

(58) Field of Classification Search
CPC . H04L 41/045; H04L 12/2898; H04L 41/046; H04L 41/5067
See application file for complete search history.

(56) References Cited

U.S. PATENT DOCUMENTS

2002/0124094 A1*   9/2002   Chang ..................... H04L 43/00
                                                            709/230
2012/0151540 A1*   6/2012   Stanwood ........... H04L 47/2416
                                                            725/109
(Continued)

FOREIGN PATENT DOCUMENTS

EP          2439903 A1      4/2012

OTHER PUBLICATIONS

International Search Report and Written Opinion mailed on Dec. 6, 2022, received for PCT Application PCT/EP2022/077274, filed on Sep. 30, 2022, 16 pages.

*Primary Examiner* — Minh Chau Nguyen
(74) *Attorney, Agent, or Firm* — XSENSUS LLP

(57)          ABSTRACT

A method is disclosed for managing the resources of a communication network connecting one or more user devices connected to a gateway connected to at least one service provider. The method comprises providing a central management module cooperating with the gateway, which stores first priority values associated types of the user devices and, for each of the user devices, identifies one or more services provided by the device and stores a respective second priority value for each service. For each service, it calculates a CoS value based on the first priority values or the second priority values. The method further comprises providing a client management module to be installed in each user device, which operates the user device to provide measurement data of a perceived QoE associated with each service. The central management module then manages the resources by processing the measurement data and the CoS values.

10 Claims, 5 Drawing Sheets

(51) Int. Cl.
    *H04L 41/046*     (2022.01)
    *H04L 41/5067*     (2022.01)

(56)                   References Cited

U.S. PATENT DOCUMENTS

| 2012/0201139 | A1 | 8/2012 | Wiley et al. | |
| 2020/0007413 | A1* | 1/2020 | Kerpez ................. | H04L 41/40 |

\* cited by examiner

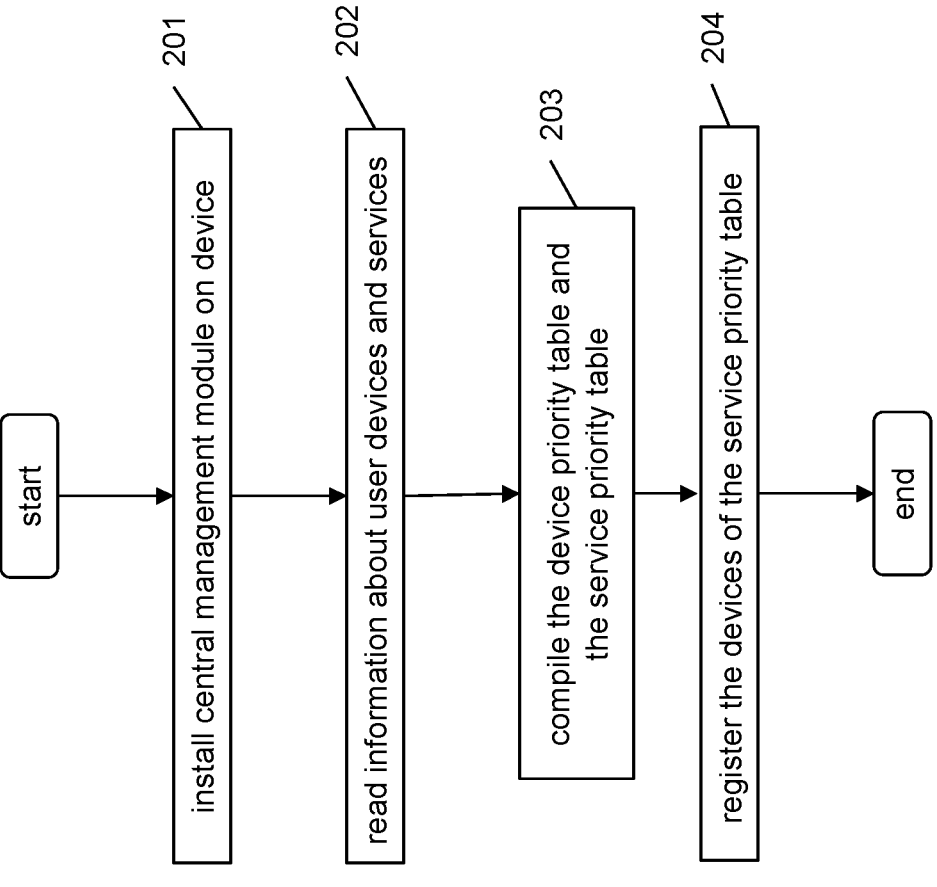
_Fig. 2_

NETWORK RESOURCE MANAGEMENT

CROSS-REFERENCE TO RELATED APPLICATIONS

The present application is based on PCT filing PCT/EP2022/077274, filed Sep. 30, 2022, which claims priority from Italian Patent Application No. 102021000025217, filed Oct. 1, 2021, the entire contents of each are incorporated herein by reference.

TECHNICAL FIELD

The present invention relates to the field of telecommunications. In particular, the present invention relates to the field of network resource management.

BACKGROUND ART

As known, home and small business networks are composed of a multiplicity of devices connected to a single modem/gateway, which typically represents the only interface point to the Internet.

Currently, the significant increase in the use of mobile devices has led to wireless connectivity being the default. Furthermore, the use of wireless home networks is expanding with the advent of smart home services to allow the management of utilities (e.g. gas, energy, water), home automation, diffusion of devices for e-health, etc.

Moreover, many services, such as, for instance, video streaming services, are still used predominantly at home either because the devices (e.g. HD TV) are not easily portable or because of the significant difference in capacity and connection costs between the fixed network and the mobile network.

As known, QoE (Quality of Experience) is an important measure of the end-to-end performance of a service from the user's perspective.

US 2018/0014051 A1 discloses an Adaptive Bitrate (ABR) Quality of Experience (QoE) Management Unit that manages bandwidth usage and QoE at a customer premises where multiple client devices independently download content from multiple providers. An overall virtual pipe to the premises includes a Hypertext Transfer Protocol (HTTP) inner pipe, a non-HTTP inner pipe, an ABR inner pipe, and a non-ABR inner pipe. The Unit determines a data cap for a current billing cycle; and determines, based on policy management settings and the data cap for the current billing cycle, at least one of: a bandwidth cap for the overall virtual pipe, a bandwidth cap for the HTTP inner pipe, a bandwidth cap for the non-HTTP inner pipe, a bandwidth cap for the ABR inner pipe, and a bandwidth cap for the non-ABR inner pipe. Responsive to the determination of the bandwidth caps, the Unit throttles traffic within at least one of the inner pipes.

SUMMARY OF THE INVENTION

The inventors noticed that the management of the network resources available in the context of home and/or small business networks is crucial, to avoid that, in the presence of numerous devices connected to the network and/or in the presence of numerous users requesting, at the same time, the same service, degradations in the quality of experience are observed, even in the absence of network failures. In particular, within a home/small business network, the most critical network resource is the bandwidth made available at the modem/gateway.

The inventors noticed that it may happen that the requests for accessing services require a higher amount of bandwidth than the bandwidth actually available. Typically, requests are served in "best effort" mode and FIFO (first-in first-out) mode with rare exceptions, such as some IPTV (Internet Protocol Television) services, for which the bandwidth is pre-allocated in a static way. This means that a lack of an effective management of network resources may cause a degradation of the quality of experience perceived by the user and an uncontrolled increase of the response times.

The inventors noticed that the method disclosed in US 2018/0014051 A1 does not provide for taking into account the quality of experience perceived by the users when determining the bandwidth caps. The perceived QoE depends not only on the network infrastructure but also on the type of user device, whose choice and performance can not be controlled by the network operators, and on the availability of the requested service/content provided by the service provider, which may be independent of the network performances.

Hence, the Applicant has tackled the problem of providing a method for the network resource management in a home or small business network that allows managing the network resources in an effective way which allows avoiding degradations in the users' perceived quality of experience.

The method of the present invention indeed provides for managing the network resources (in particular, the bandwidth) allocated to the different services in an adaptive manner which is based on the users' perceived quality of experience.

According to a first aspect, the present invention provides a method for managing the resources of a first communication network connecting one or more user devices, said user devices being connected to a gateway, the gateway being connected to at least one service provider via a second communication network, the method comprising:

providing a central management module cooperating with the gateway, and, by the central management module:

storing first priority values associated with one or more types of the user devices, each type of user device being associated with one or more services that may be provided by the type of user device;

for each of the user devices, identifying one or more services provided by the device and storing a respective second priority value for each provided service;

for each provided service, calculating a CoS value based on the first priority values or the second priority values;

providing a client management module to be installed in each of the user devices, wherein the method further comprises:

by the client management module, operating the user device to provide measurement data of a perceived quality of experience associated with each service provided to the user by means of the user device; and by the central management module, managing the resources by processing the following information:

the measurement data of a perceived quality of experience; and the CoS values.

Preferably, the measurement data associated to a service comprise a measured quality of experience comprising an index of perceived quality of experience and an actual delay.

Preferably, the central management module stores a list of service types and, for each service type, a bandwidth threshold, BT, indicating a minimum bandwidth that is required to run the service and/or a delay threshold, DT, indicating a maximum acceptable delay.

Preferably, the method further comprises, when the user is requesting a service from one of the user devices checking, by the central management module, whether an available bandwidth, AvB, is higher than the bandwidth threshold, BT, for the requested service and whether the actual delay, AD, is lower than the delay threshold, DT, for the requested service;

Preferably, the method further comprises, in case the requested service is not associated with any of a first priority value or a second priority value:

if the checking is positive, managing the resource to provide the requested service in a best effort mode; and if the checking is negative, informing the user that the requested service can be provided with possibly poor quality and, in case the user accepts to be provided with the requested service, managing the resources to provide the requested service in a best effort mode and storing a QoE marker associated with the requested service, the QoE marker indicating that the requested service is provided upon the user's request despite the fact that the checking is negative.

Preferably, the method further comprises, in case the requested service is associated with any of a first priority value or a second priority value:

if the checking is positive, managing the resources to provide the requested service based on the CoS value associated with the requested service; and if the actual delay, AD, is higher than the delay threshold, DT, and the available bandwidth, AvB, is higher than the bandwidth threshold, BT, informing the user that the requested service can be provided with possibly poor quality and, in case the user accepts to be provided with the requested service, managing the resources to provide the requested service based on the CoS value associated with the requested service, and storing a QoE marker associated with the requested service, the QoE marker indicating that the requested service is provided upon the user's request despite the fact that the actual delay, AD, is higher than the delay threshold, DT;

if the available bandwidth, AvB, is lower than the bandwidth threshold, BT, implementing an adaptive management procedure for managing the resources; and if the actual delay, AD, is higher than the delay threshold, DT, and the available bandwidth, AvB, is lower than the bandwidth threshold, BT, informing the user that the requested service can be provided with possibly poor quality and, in case the user accepts to be provided with the requested service, implementing the adaptive management procedure for managing the resources, and storing a QoE marker associated with the requested service, the QoE marker indicating that the requested service is provided upon the user's request despite the fact that the actual delay, AD, is higher than the delay threshold, DT, and the available bandwidth, AvB, is lower than the bandwidth threshold, BT.

Preferably, the adaptive management procedure comprises:

comparing the priority associated with the requested service with the priorities of currently active services;

if the requested service is associated with a priority value lower than the priority value associated with any other currently active service, informing the user that the requested service can be provided with possibly poor quality and, in case the user accepts to be provided with the requested service, managing the resources to provide the requested service based on the CoS value associated with the requested service and storing a QoE marker associated with the requested service, the QoE marker indicating that the requested service is provided upon the user's request despite the fact that the available bandwidth, AvB, is lower that the bandwidth threshold, BT;

if the requested service is associated with a priority value higher than the priority value associated with any other currently active service, or the sum of the bandwidth thresholds, BT, associated with currently active services having a same or higher CoS value is lower than a line data rate, CS, of the gateway, managing the resources to provide the requested service based on the CoS value associated with the requested service, and informing the users of currently active services having a lower CoS value that a perceived quality of experience may degrade;

If the sum of the bandwidth threshold, BT, associated with the requested service and the bandwidth thresholds, BT, associated with currently active services having a same or higher CoS value is higher than the line data rate, CS, ordering the services based on the first priority value or the second priority value, identifying, within the ordered services, allowed services that may be provided without violating the bandwidth threshold, BT, downgrading the CoS values of the services that are not comprised within the allowed services, informing the users of currently active services having a lower CoS and of the services not comprised within the allowed services value that a perceived quality of experience may degrade, and storing a QoE marker associated with the services that are not comprised within the allowed services, the QoE marker indicating that the services are downgraded.

Preferably, the method further comprises calculating an overall index of perceived quality as a weighted average of the indexes of perceived quality of experience of currently active services.

Preferably, the method further comprises, for a service whose actual delay, AD, is lower than the delay threshold, DT, and when the available bandwidth, AvB, is higher than a sum of actual bandwidths of the currently active services, checking, by the central management module, whether, on the basis of the measurement data of a perceived quality of experience, the service is experiencing a degradation in the measured quality of experience, and, in case the checking is positive, modifying the CoS value of the service and monitoring the index of perceived quality of experience of the service and the overall index of perceived quality of experience to confirm or cancel the modification.

According to a second aspect, the present invention provides a system for managing the resources of a first communication network connecting one or more user devices, the user devices being connected to a gateway, the gateway being connected to at least one service provider via a second communication network, the system comprising a central management module cooperating with the gateway configured to:

store first priority values associated with one or more types of the user devices, each type of user device being associated with one or more services that may be provided by the type of user device;

for each of the user devices, identify one or more services provided by the device and storing a respective second priority value for each provided service;

for each provided service, calculate a CoS value based on the first priority values or the second priority values;

provide a client management module to be installed in each of the user devices and configured to operate the user device to provide measurement data of a perceived quality of experience associated with each service provided to the user by means of the user device; and manage the resources by processing the following information:

the measurement data of a perceived quality of experience;

the CoS values.

BRIEF DESCRIPTION OF THE DRAWINGS

The present invention will become clearer from the following detailed description, given by way of example and not of limitation, to be read with reference to the accompanying drawings, wherein:

FIG. 2 is a flowchart of the steps of an initialization phase according to the method of the present invention.

DETAILED DESCRIPTION OF PREFERRED EMBODIMENTS OF THE INVENTION

Figure 1:
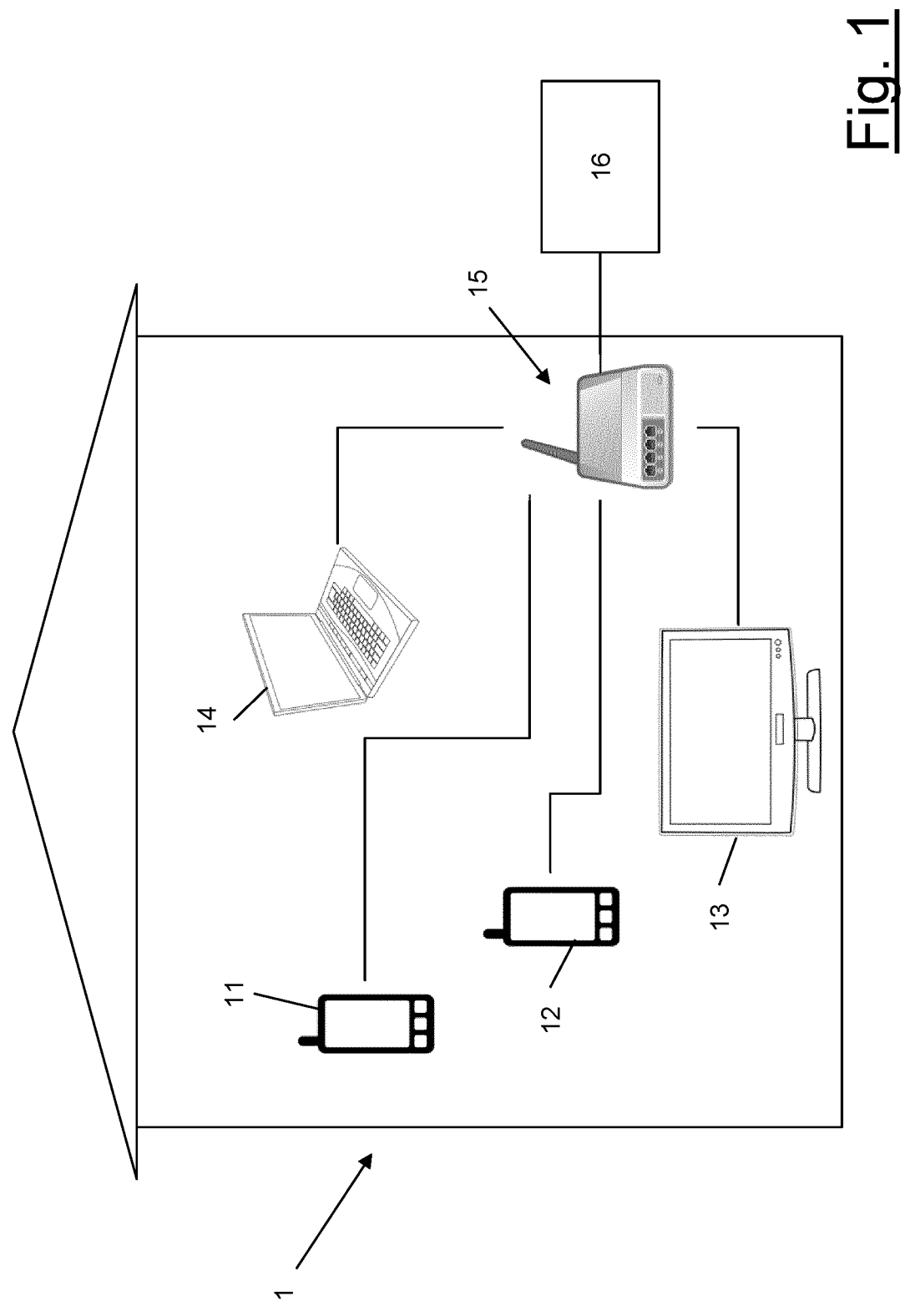
FIG. 1 schematically illustrates an exemplary home network and a system for managing the network resources according to an embodiment of the present invention.

FIG. 1 schematically shows an exemplary home network 1 containing a plurality of user devices, which may comprise telecommunication devices, appliances and so on. The user devices schematically shown in FIG. 1 comprise, for sake of example, a first smartphone 11, a second smartphone 12, a smart TV 13 and a notebook 14.

For simplicity, in the following description, reference will be made to a home network. However, this choice is not to be considered as limiting the scope of the present invention, as other types of networks can be considered as well, such as small business networks. More generally, the present invention can be applied to any network in which, given the available bandwidth and the number of users who may connect, it is important to define a network resource management mechanism.

The plurality of user devices are connected in a local area network (LAN), in particular a wireless local area network. As schematically shown in FIG. 1, the user devices are connected in the local area network via a gateway 15 providing access to an external data network, such as the Internet, through which the gateway may be connected to one or more service providers. The gateway 15 may comprise a router and a modem, such as a xDSL modem.

According to the present invention, a management system is provided to implement a network resource management service to manage the home network resources. The user devices within the home network may access the network resource management service by undergoing a device registration procedure, as it will be described herein after.

According to an embodiment of the present invention, the management system comprises a central management module and corresponding client management modules to be installed on the user devices of the home network. The central management module is preferably hosted in a device that may be a computer connected to the gateway 15. In FIG. 1, it is represented by the box with reference number 16. According to another embodiment, the central management module is hosted in the gateway 15.

Preferably, the central management module and the client management modules of the management system are software modules. More preferably, a client management module is an applet.

Preferably, the central management module is configured to:

cooperate with the hardware/software modules of the gateway;

implement the device registration procedure;

provide a user interface, in particular a graphical user interface (GUI), to a user of the system (namely, for instance, an end user or a system administrator);

manage a number of data tables for the monitoring of the quality of experience (QoE);

gather QoE measurement data (comprising, for instance, an index of perceived QoE) from the user devices within the home network.

The device registration procedure implemented by the central management module preferably comprises the following steps:

retrieving data identifying the user device (e.g. IP address) from the gateway;

sending to the user device a client management module configured to provide QoE measurement data for the one or more services provided to the user by means of the user device;

storing a set of priorities for the user device and for the services that may be provided to the user by means of the user device within the home network. The priorities are preferably defined by a system administrator.

The client management module is preferably configured to provide a graphical user interface (GUI) to a user of the user device to interact with the central management module. Interaction between the central management module and a client management module comprises exchanging messages between the two modules, as it will be described herein after. Moreover, the client management module is preferably configured to measure an index of perceived QoE for each service that it may provide and to send it to the central management module.

In particular, for instance, when a service is to be provisioned to a user of the user device and the central management module detects that the available bandwidth is lower than the bandwidth actually requested for the service provisioning, the client management module issues a corresponding message, which is presented to the user through the user interface mentioned above. The user preferably selects, through the client management module, in particular through its user interface, whether she/he wants to use the service anyway or not to use it. Then, the client management module preferably notifies, by issuing a corresponding message, the central management module about the user's choice and, in case the user selects to use the service anyway, the central management module preferably "marks" the service. According to the present invention, a service is marked when it is provided to the user notwithstanding a violation of a bandwidth or delay requirement, as it will be defined herein below. All these operations will be further described herein after.

The client management module is preferably further configured to calculate an index of perceived QoE for a given service by periodically measuring, in an automatic manner (i.e. in the absence of any user request), at predefined regular intervals (e.g. every minute) one or more parameters indicative of the perceived QoE, such as the latency, and then associating an integer number to each set of parameters' measurements, the integer number preferably ranging between a minimum value, e.g. 1, indicating a poor QoE, and a maximum value, e.g. 5, indicating an excellent QoE. The choice of the parameters to be measured may vary according to the considered service. These operations will be further described herein after.

The method of the present invention will be described in detail herein after with reference to FIGS. 2-5. In particular, the method according to the present invention preferably comprises an initialization phase and a runtime phase.

Initialization

FIG. 2 is a flowchart of the initialization phase according to embodiments of the present invention At step 201, the system administrator installs the central management module on a device suitable for hosting it, for instance a PC in the home network. According to other embodiments, the central management module may be installed on the same device hosting the gateway. The device on which the central management module is hosted will be referred to in the following description as central management device.

The central management module preferably comprises one or more tables that, during the initialization phase and the runtime phase, are populated with data related to the services that may be provided to the user devices of the home network. In particular, the central management module preferably comprises:

a service threshold table (see Table 1 illustrated herein below);

a device priority table (see, for example, Table 2 illustrated herein below); and a service priority table (see, for example, Table 3 illustrated herein below)

During operation, the tables listed above preferably comprise the following data.

The service threshold table preferably comprises a list of service types and, for each service type, a bandwidth threshold, BT, indicating a minimum bandwidth that is required to run the service and/or a delay threshold, DT, indicating a maximum acceptable delay, i.e. a minimum bandwidth and/ or a maximum delay guaranteeing an acceptable QoE to the user, according to standardized values. The service threshold table is editable only by the provider of the management system possibly using data provided by standardization bodies or service providers. For instance, the bandwidth threshold for an IPTV service may be 4 Mb, while the delay threshold for an online gaming service may be 40 ms.

The device priority table preferably comprises a list of device types and, for each device type, a list of one or more services (which may be indicated by corresponding identifiers) that can be accessed on a user device of the considered device type, an information (e.g., an integer number value) indicating a priority of the considered device type within the home network, and an information indicating a class of service (CoS) offered by the gateway for each service provided by a user device of the considered device type, as it will be described herein after. The device priority table is editable by the user/administrator of the management system. In particular, preferably, the system administrator writes the information related to the device types, the services and the device type priorities, while the CoS information will be calculated by the central management module, as it will be described herein after.

The service priority table preferably comprises a list of the user devices which are active (namely, for instance, user devices that are currently exchanging data with the gateway) within the home network and, for each user device of the home network: a device identifier (or, device ID), which may be an alphanumeric string of characters univocally identifying the considered user device; an IP address of the user device; an information indicating a type of the user device (e.g. laptop, PC, TV tablet, smartphone, game console, etc.); a list of one or more services (which may be indicated by corresponding identifiers) that can be accessed on the user device; a unique information (e.g., an integer number value) indicating a priority associated with each service, this priority being preferably independent of the user device; and an information indicating a class of service (CoS) offered by the gateway for each considered service, as it will be described herein after. The service priority table is editable by the user/administrator of the management system, and it is preferably updated each time a new user device is connected in the home network. This table may be partially filled with the devices' information collected from the gateway and input by the system administrator, while the CoS information will be calculated by the central management module, as it will be described herein after.

The class of service (CoS) is a parameter having an integer value. Each CoS value is associated with a respective type or class of traffic (e.g. video, voice, web navigation, etc.) within the communication network. The CoS may have an integer value ranging within a predefined interval, e.g. between 0 and 5. The CoS values are used by the gateway to prioritize traffic e.g. in case of queues.

It is to be noticed that if a service provided by a user device is not assigned a priority, the service is preferably managed in a "best effort" mode. Moreover, if a service is offered which is not listed in the service threshold table, this service will not be assigned any priority and it will be managed in a "best effort" mode.

When, at step 201, the central management module is installed in the central management device, the device priority table and the service priority table may be partially precompiled, or partially populated by the system administrator with, e.g. the list of device types and the related services.

At the end of the installation, the system administrator is preferably presented, on a display of the central management device, with a notification that the installation has been successfully performed.

TABLE 1

| Service type | Min bandwidth | Max delay |
|---|---|---|
| Online gaming | | 40 ms |
| IPTV | 4 Mb | |
| . . . | | |

TABLE 2

| Device type | Services | Device Priority | CoS |
|---|---|---|---|
| TV | IPTV/VOD<br>Web navigation<br>Online gaming | 1 | 4 |
| Gaming console | Online gaming | 2 | 3 |
| Tablet | Video streaming<br>Web navigation<br>Online gaming | 3 | 3 |
| Tower PC | Video streaming<br>Web navigation<br>Online gaming | 4 | 3 |
| Smartphone | Video streaming<br>Web navigation<br>Online gaming | 5 | 2 |
| Home network device | Communication with user | 10 | 1 |
| . . . | . . . | . . . | . . . |

TABLE 3

| Device ID | IP address | Type | Services | Service priority | CoS |
|---|---|---|---|---|---|
| xxx | 192.168.xx.xx | TV | IPTV/VOD<br>Online gaming | 1<br>3 | 4<br>3 |
| yyy | 192.168.yy.yy | Tablet | Video streaming<br>Web navigation | 2<br>5 | 4<br>3 |
| zzz | 192.168.zz.zz | Tower PC | Web navigation<br>Online gaming | 4<br>20 | 3<br>1 |
| xyz | 192.168.zz.zz | Smart home device | Communication with user | 50 | 1 |
| . . . | . . . | . . . | . . . | . . . | . . . |

At step 202, the central management module preferably automatically populates the service priority table with the following information retrieved from the gateway: for each user device, the device identifier, the IP address of the user device, the information indicating a type of the user device and the list of one or more services that can be accessed on the user device. It is to be noticed that the central management module, once running on the central management device, may also automatically retrieve from the gateway part of the information of the device priority table, namely an information indicating the device type and the list of the one or more services that can be accessed on the device.

The information described above may alternatively be input in the device priority table and in the service priority table manually by the system administrator after having retrieved them from the gateway, by means of an input peripheral (e.g. a keyboard) connected to the central management device.

At step 203, the central management module preferably presents to the system administrator the device priority table and the system administrator preferably compiles the device priority table with a priority value for each considered device type. Then, the central management module preferably computes, for each considered device type, a CoS value (namely, a value of the class of service offered by the gateway for the services of the considered device type) and compiles the device priority table by associating each listed device with the computed CoS value.

Moreover, the central management module preferably presents to the system administrator the service priority table. At this step, the system administrator may compile the service priority table with the information that she/he has retrieved from the gateway (device ID, IP address, device type, associated services), as described above. Moreover, the system administrator preferably compiles the service priority table with a priority value for each considered service. Then, the central management module preferably computes, for each considered service, a CoS value (namely, a value of the class of service offered by the gateway for the considered service) and compiles the service priority table by associating each listed service with the computed CoS value.

The CoS value in each table is preferably associated with the device type or with the specific service provided by a given user device. It is computed by the central management module on the basis of, respectively, the priority value of the device type or the priority value of the service. As already anticipated above, the CoS value may be an integer number ranging between 0 and 5. For instance, a CoS value equal to 1 may be assigned to services having no priority, a CoS value of 5 may be assigned to voice services and CoS values within the range 2-4 may be assigned to data transmission services, where the value of 4 may indicate the highest class for data transmission services. Another example of computation of the CoS value by the central management module is the following: the central management module may define a distribution, in percentage terms, of services belonging to the various CoS classes (e.g. 5% services in CoS 4, 10% services in CoS 3, 20% services in CoS 2 and the remaining 65% services in CoS 1) and consequently map these values over services according to that distribution. The devices and/or services that are not present in the device priority table or in the service priority table are preferably associated with the lowest priority value and with a Cos value equal to 1.

The CoS values as computed by the central management module are then used to determine a set of rules provided to the gateway to manage the queues related to the requests of the services. For each service, the CoS value that is used is preferably the CoS value reported in the service priority table, if present. If such a value is not available, the more generic CoS value reported in the device priority table as associated with the device type is used.

At step 204, the system administrator preferably selects, from the devices listed in the service priority table, the devices to be registered and, for each of them, preferably operates the central management module to complete its registration. In particular, the central management module preferably operates the central management device to send to each selected device a respective client management module. Once the client management module is installed in the related device, it preferably issues a first message which is sent to the central management module, the first message indicating that the installation of the client management module has been completed and that registration of the device has been completed. Moreover, the client management module preferably issues a second message to be shown to the user of the corresponding device through the user interface, indicating that the device is a registered device within the home network.

As already anticipated above, it is to be noticed that if a service, on a considered device, is not assigned a priority, it will be managed in a "best effort" mode. Moreover, in case a service is offered to the user which is not listed in the service threshold table, this service will be managed in the "best effort" mode.

Moreover, each time a new device is added to the home network, which is to be registered to the network resource management service, the system administrator preferably compiles the service priority table with the related information (i.e. device ID, IP address, device type, list of services and the priority values for the services). If the device is of a device type not already present in the device priority table, the system administrator preferably adds the device type in the device priority table with the related information (i.e. device type, list of services and the priority value for the device). Then, the central management module preferably computes a CoS value for each service provided by the new device, as already described above. Moreover, the central management module preferably sends to the new device a client management module. Once the client management module is installed in the new device, it preferably sends a first message to the central management module, the first message indicating that the installation of the client management module has been completed and that registration of the device has been completed. Moreover, the client management module preferably issues a second message to be shown to the user of the new device, possibly through the user interface mentioned above, indicating that the device is a registered device within the home network.

It is further to be noticed that the user/administrator of the management system may modify the priority values that have been assigned to the services and to the types of devices. This modification is implemented any time a new device is registered to the network resource management service or when the list of services that may be provided within the home network is updated. In case the priority values are modified, the central management module preferably recalculates the related CoS values.

Runtime

During the runtime phase, the central management module preferably creates and updates a QoE measurement table, whose content is illustrated herein below as Table 4. The QoE management table is not editable by the system administrator.

In Table 4, the following notations are used:

TABLE 4

| TS | Dev. ID | Serv. | Class.? (yes/no) | P | AB | AD | Meas. QoE | QoE mark. |
|---|---|---|---|---|---|---|---|---|
| . . . | . . . | . . . | . . . | . . . | . . . . . . | | . . . | . . . |
| . . . | . . . | . . . | . . . | . . . | . . . . . . | | . . . | . . . |
| . . . | . . . | . . . | . . . | . . . | . . . . . . | | . . . | . . . |

TS = timestamp;
Dev. ID = Device ID;
Serv. = Service;
Class.? = is the service classified?
P = Priority;
AB = Actual Bandwidth;
AD = Actual Delay;
Meas. QoE = Measured QoE;
QoE mark. = QoE marker.

The QoE measurement table preferably comprises, for each pair device/service (Dev. ID/Serv.), when the service has been classified (in this case, the column named "Class.?" contains an indication "yes"), the last N values (where N is an integer number higher than one, e.g. two) of measured QoE (Meas. QoE) and the actual values of the bandwidth (AB) and the delay (AD). The measured QoE of a service may comprise a corresponding index of perceived QoE, as mentioned above. The timestamp TS identifies the instant of time of the QoE measurement. The actual bandwidth AB is the bandwidth actually used by the service at the time indicated by the timestamp TS, whose value can be read from the gateway.

As already anticipated above, the column with the notation "Class.?" used in this description contains an indication as to whether the service is classified or not. The cells of this column contain either a corresponding positive indication (yes) or a corresponding negative indication (no). According to the present invention, a service is classified if it has been assigned a priority value by the system administrator.

The notation P relates to a priority field comprised in the QoE measurement table. The value of the priority field P comprised in the QoE measurement table is computed by the central management module as follows:

$$P = \text{Device Priority} \times W + \text{Service Priority} \qquad [1]$$

where the Device Priority is the value comprised in the device priority table described above, the Service Priority is the value comprised in the service priority table described above and W is a weight that is to be suitably selected to emphasize the Device Priority. Preferably, the weight is selected by the system administrator and, for instance, it may be manually input by the system administrator in the central management device. For a specific user device, the weight should be greater when the requests from that device should be satisfied. On the other hand, a weight smaller than or equal to 1 indicates that the user device has a low priority. For instance, a PC used for working purposes may have a weight equal to 10 while a gaming console a weight equal to 1.

The QoE marker (column "QoE mark.") is used to indicate three possible states for each service:

service that is provided, upon user request, notwithstanding the fact that the available bandwidth and/or the actual delay do not comply with the bandwidth threshold BT and/or the delay threshold DT comprised in the service threshold table described above;

upgraded service, in terms of CoS, as a result of an adaptive management procedure, which will be described in detail herein after; and downgraded service, in terms of CoS, as a result of the adaptive management procedure, which will be described in detail herein after.

During runtime, the QoE measurement table is constantly updated. The central management module receives the QoE measurements from the registered user devices of the home network and computes the QoE marker. Each registered user device, through its client management module, preferably communicates the QoE measurements to the central management module at regular intervals of time and the central management module preferably stores the last N measurements from each registered user device in the QoE measurement table.

In the following lines, a group of indexes of perceived QoE or, simply, QoE indexes, will be described, which may be used to measure the QoE of the different types of services. Each index preferably ranges within an interval of discrete integer values, e.g. from 1 to 5, where 1 indicates the lowest QoE index and 5 indicates the highest QoE index.

Online Gaming Services

To measure the QoE for a gaming service, a PING command is preferably executed (via TCP or UDP) to a reference server or to the server that is providing the gaming service. Typically, the command fails if the reply is not received within 5 seconds since the time the command was sent. In case the reply is received within 5 seconds, three different situations can be identified:

if the delay is lower than 40 ms, the QoE index is preferably set to 5. In this case, indeed, the standard ETSI ES 202 765-4 V1.1.1 (2010-10) "Speech and multimedia Transmission Quality (STQ); QoS and network performance metrics and measurement methods; Part 4: Indicators for supervision of Multiplay services", section 6.7, page 16, indicates that the user is not perceiving any quality degradation during the gaming session;

if the delay is higher than 80 ms, the QoE index is preferably set to 1. In this case, indeed, the standard mentioned above indicates that the user is prevented from performing the gaming operations due to the delay;

for the cases where the delay is comprised between 40 ms and 80 ms, the QoE index is preferably set to 2 if the delay is higher than 60 ms and to 3 in all the other cases. Indeed, in this case, the standard mentioned above indicates that the gaming operations are possible but approximate, as the user is forced to play in advance.

P2P Services and File Transfer

In this case, a bandwidth reliability measure may be used to derive a QoE index. A bandwidth reliability measure BR may be determined as follows:

$$BR = \frac{bitrate}{CS - OH} \times 100$$

where CS is the line data rate that may be read in the configuration page of the modem comprised in the gateway and OH is a protocol overhead whose value depends on the transmission type and protocol that are used. The QoE index may then be determined as follows:

$$QoE \text{ index} = 1 \text{ if } BR \le 20\%;$$

$$QoE \text{ index} = 2 \text{ if } 21\% \le BR \le 40\%;$$

$$QoE \text{ index} = 3 \text{ if } 41\% \le BR \le 60\%;$$

$$QoE \text{ index} = 4 \text{ if } 61\% \le BR \le 80\%;$$

$$QoE \text{ index} = 5 \text{ if } BR > 80\%.$$

Web Navigation Services

In this case, a performance web navigation measure may be used to derive a QoE index. A performance web navigation measure PWN may be determined as follows:

$$PWN = \frac{\sum_{i=1}^{NP} PWN(i)}{NP} \times 100$$

where NP is the number of the considered pages, i is an integer, i=1, . . . , NP, and PWN (i) is the ratio between a threshold navigation time (e.g. 3-4 sec), which is a predetermined value based on the size of the downloaded page, and an average navigation time for the i-th page, which is determined as the interval between the time at which the request to download the i-th page is sent and the time at which the entire page is locally downloaded.

The QoE index may then be determined as follows:

$$QoE \text{ index} = 1 \text{ if } PWN \le 40\%;$$

$$QoE \text{ index} = 2 \text{ if } 41\% \le PWN \le 66\%;$$

-continued $$QoE \text{ index} = 3 \text{ if } 67\% \le PWN \le 80\%;$$

$$QoE \text{ index} = 4 \text{ if } 81\% \le PWN \le 94\%;$$

$$QoE \text{ index} = 5 \text{ if } PWN > 95\%.$$

If an error occurs during the download of a page, that page is not considered to determine the performance web navigation measure.

Multimedia Content Services and Videoconferencing Services (e.g. Skype™ and VoIP)

In this case, the QoE index may be derived from the index of perceived quality Q described in EP2364540 in the name of the same Applicant. It is to be noticed that this index does not depend on the intrinsic quality of the content, which means that the index may be high even when the content has a low definition, if the service is provided without any bandwidth interruption or retransmission. The index Q has a value comprised between 0 (worst perceived quality) and 1 (best perceived quality). The QoE index is determined by using index Q and normalizing its value between 1 and 5.

IPTV and VoD Services

The QoE index may be determined on the basis of one or more parameters indicative of the perceived quality. One parameter may be related to the number of errored packets and their frequency of occurrence. The time instants of the errored packets and their number can be processed by means of the formulas described in EP2364540 for $Q_0$ and Q, thus obtaining, for instance, a first value comprised between 0 and 1.

Moreover, if the user device allows installing a client management module, other parameters may be detected, such as the presence and relative frequency of the gaps within the audio/video data stream. Also in this case, the parameters may be processed by means of the formulas described in EP2364540 to obtain, for instance, a second value.

Furthermore, even other parameters may be considered, such as the jitter and/or the packet loss. The QoE index may then be determined by weighting all the processed values described above.

Overall QoE Index

An overall QoE index is the weighted average of the QoE indexes of the active services, excepts those that are marked due to violation of the bandwidth threshold BT or the delay threshold DT. The active services may be identified as those services associated with a valid QoE measurement or those services which are currently exchanging data with the gateway (this information can be read in the modem configuration page). A "valid" QoE measurement is a QoE measurement that can actually be performed (for instance, if the user device is switched off, the QoE measurement cannot be performed) and that has a nonzero value.

The overall QoE index $QoE_o$ may be determined as:

$$QoE_o = \sum_{i=1}^{NS} \frac{QoE_i \times \frac{1}{P_i}}{NS}$$

where NS is the number of currently active services, i is an integer, i=1, . . . , NS, $QoE_i$ is the QoE index of the i-th service and $P_i$ is its priority as retrieved from the QoE measurement table.

In the following lines, the steps of the method according to the present invention will be described with reference to the runtime phase, in particular when a user of the home network, who is possibly already using one or more active services, requests to be provided with another service from one of the user devices. This service will be referred to as "new service".

Runtime—Request of a New Service

Figure 3:
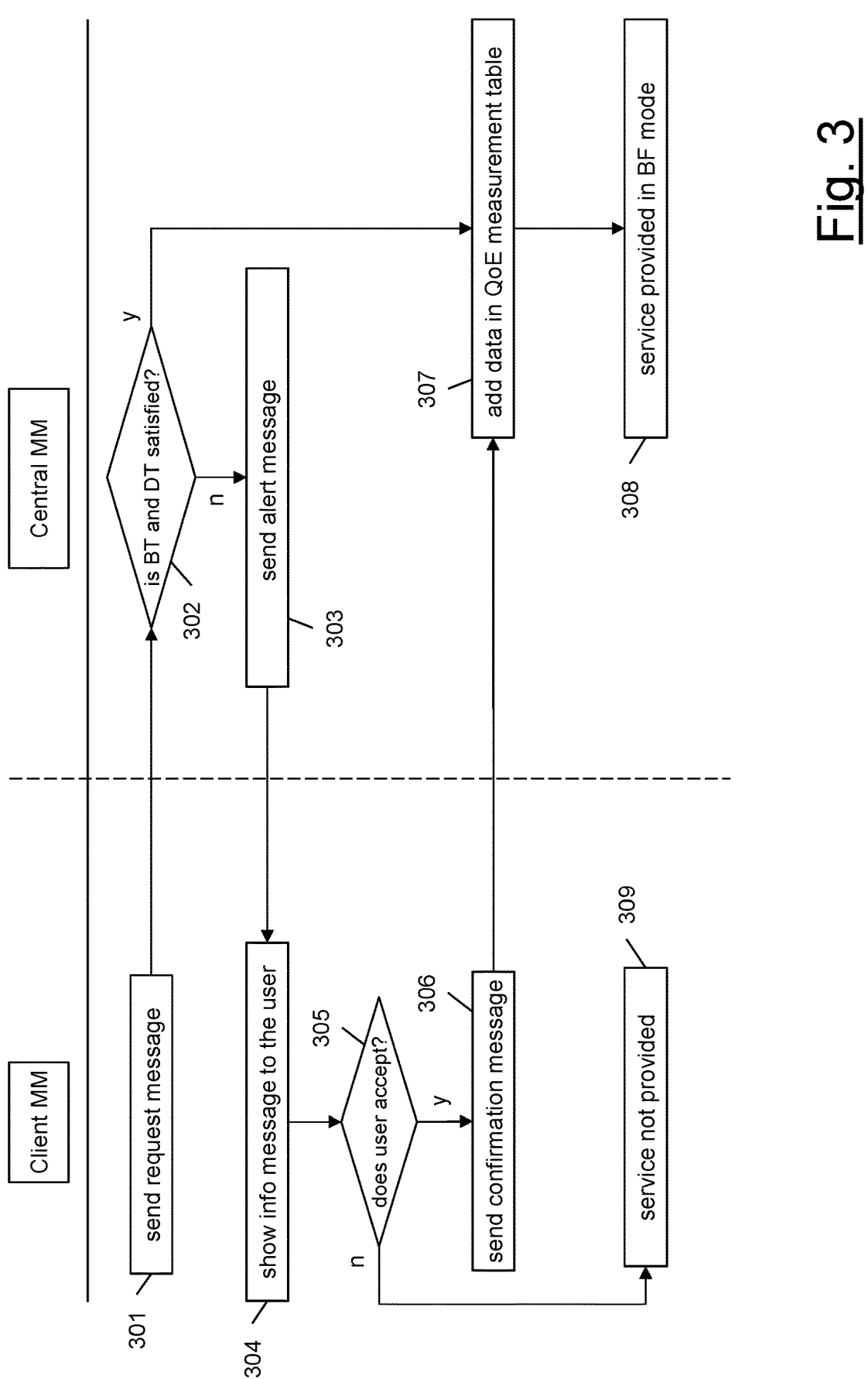
FIG. 3 is a flowchart illustrating steps of a runtime phase for a not classified service according to the method of the present invention.
Figure 4:
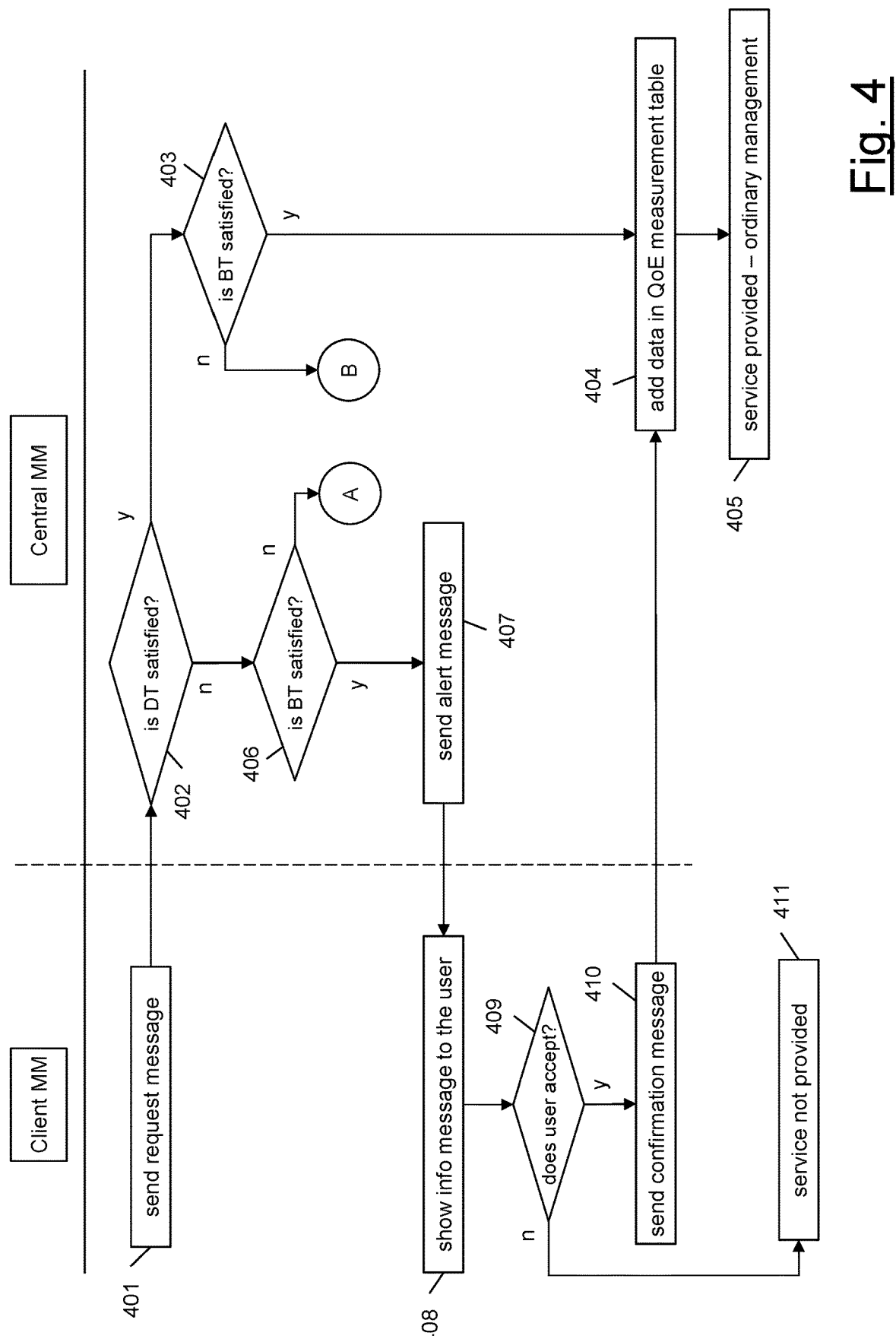
FIG. 4 is a flowchart illustrating steps of a runtime phase for a classified service according to the method of the present invention.

FIG. 3 is a flowchart illustrating the steps of the method according to the present invention during runtime in case a user requests a new service that is not classified (i.e. the service has not been assigned any priority value by the system administrator).

It is assumed that the user is requesting a new service by using its registered device, for instance the user is requesting to open an Internet navigation session by using her/his smartphone. The user device is provided with the respective client management module that possibly comprises, as already anticipated above, a user interface, in particular a graphical user interface (GUI), through which the user may interact with the client management module itself.

At step 301, the client management module (indicated as "Client MM", in FIG. 3) that is running on the user device preferably sends a request to the central management module (indicated as "Central MM" in FIG. 3) indicating that the user is requesting the new service. Upon receiving the request, at step 302, the central management module preferably checks whether an available bandwidth AvB is higher than the bandwidth threshold BT indicated in the service threshold table for the considered service and whether the actual delay AD is lower than the delay threshold DT indicated in the service threshold table for the considered service.

The available bandwidth AvB is preferably computed by the central management module as follows:

$$AvB = CS - \sum_{i=1}^{M} BT(i) \qquad [2]$$

where CS is the line data rate that may be read in the gateway configuration page and corresponds to the download speed, M is the number of currently active services (M being an integer number equal to or higher than 1), i is an integer, i=1, 2, ..., M, and BT(i) is the bandwidth threshold for the i-th active service.

The actual delay AD can be determined by the central management module by performing, for instance, a PING test.

If both checks of step 302 are positive, the central management module preferably manages the home network resources so that the new service is provided to the user device in the "best effort" mode (step 308). Moreover, the central management module preferably adds a row in the QoE measurement table (step 307) with data comprising: the device ID, an information indicating the new service, an information indicating that the service is not classified (namely, "no" in the related column "Class.?" shown in Table 4 herein above).

In case any one of the two checks of step 302 is negative, the central management module preferably issues an alert message and sends it to the client management module (step 303). At step 304, the client management module, upon reception of the alert message, preferably issues an info message to be shown to the user, possibly through the graphical user interface, indicating that the new service can be provided with possibly poor quality and asking the user whether she/he accepts to be provided with the new service anyway (step 305).

If the user accepts (e.g. by clicking on a corresponding button of the graphical user interface of the client management module), the client management module preferably issues a confirmation message which is sent to the central management module (step 306). At this point, the central management module preferably updates a row in the QoE measurement table (step 307) with data comprising: the device ID, an information indicating the new service, an information indicating that the service is not classified (namely, "no" in the related column "Class.?" shown in Table 4 herein above) and a QoE marker indicating that the new service is a provided service notwithstanding the fact that the quality is possibly poor in terms of the actual delay or the available bandwidth. In this way, the new service entered in the QoE management table is a marked service. Then, at step 308, the central management module preferably manages the home network resources so that the new service is provided to the user device in the "best effort" mode.

If, at step 304, the user does not accept to be provided with the new service due to the possibly poor quality, the new service is not provided to the user (step 309).

The following lines will describe the steps of the method according to the present invention during runtime in case a user requests a new service that is already classified (i.e. a service that has been assigned a priority value). These steps will be illustrated with reference to the flowcharts of FIGS. 4 and 5.

Also in this case, the client management module that is running on the user device preferably sends a request to the central management module indicating that the user is requesting the new service (step 401). Upon receiving the request, the central management module preferably checks whether the available bandwidth AvB is higher than the bandwidth threshold BT indicated in the service threshold table for the considered service and whether the actual delay AD is lower than the delay threshold DT indicated in the service threshold table for the considered service (steps 402 and 403). The available bandwidth AvB and the actual delay AD are preferably determined as already described above.

In case both checks are affirmative (branch "y" at step 402 and at step 403), the central management module, at step 404, preferably adds a row in the QoE measurement table with data comprising: the device ID, an information indicating the new service, an information indicating that the service is classified (namely, "yes" in the related column "Class.?" shown in Table 4 herein above). Then, the central management module preferably manages the home network resources so that the new service is provided to the user device according to a runtime ordinary management procedure which is based on the data collected in the QoE measurement table (step 405), as it will be described herein after.

If the actual delay is higher that the delay threshold DT (branch "n" at step 402) while the available bandwidth AvB is higher than the bandwidth threshold BT (branch "y" at step 406), the central management module preferably issues an alert message and sends it to the client management module (step 407). The client management module, upon reception of the alert message, preferably issues an info message to be shown to the user (step 408), possibly through the graphical user interface, indicating that the new service can be provided with possibly poor quality and asking the user whether she/he accepts to be provided with the new service anyway (step 409). If the user accepts (e.g. by clicking on a corresponding button of the graphical user interface of the client management module), the client management module preferably issues a confirmation message which is sent to the central management module (step 410). At this point, the central management module preferably adds a row in the QoE measurement table (step 404) with data comprising: the device ID, an information indicating the new service, an information indicating that the service is classified (namely, "yes" in the related column "Class.?" shown in Table 4 herein above) and a QoE marker indicating that the new service is a provided service notwithstanding the fact that the quality is possibly poor in terms of the actual delay. In this way, the new service entered in the QoE management table is a marked service. Then, at step 405, the central management module preferably manages the home network resources so that the new service is provided to the user's device according to the runtime ordinary management procedure based on the data collected in the QoE measurement table, as it will be described herein after.

If the actual delay is lower that the delay threshold DT (branch "y" at step 402) while the available bandwidth AvB is lower that the bandwidth threshold BT (branch "n" at step 403 of FIG. 4), the central management module preferably adds a row in the QoE measurement table (step 505 of FIG. 5) with data comprising: the device ID, an information indicating the new service, an information indicating that the service is classified (namely, "yes" in the related column "Class.?" shown in Table 4 herein above). Then, at step 506, the central management module preferably manages the home network resources so that the new service is provided to the user's device according to a runtime priority management procedure that will be discussed herein after.

Figure 5:
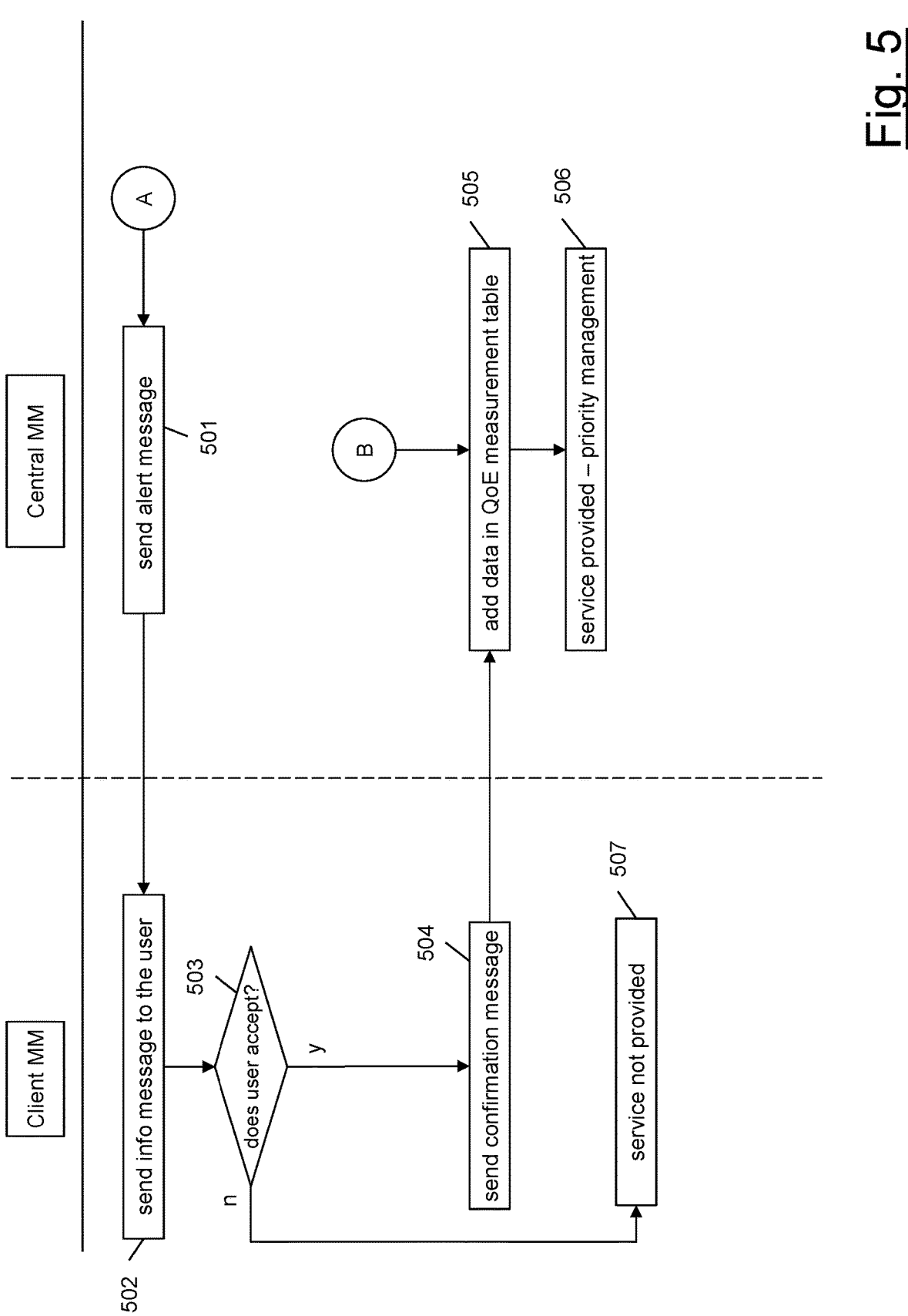
FIG. 5 illustrates other steps of the runtime phase for a classified service according to the method of the present invention.

If both the checks are negative (branch "n" at steps 402 and 406 of FIG. 4), namely in case the actual delay AD is higher that the delay threshold DT and the available bandwidth AvB is lower that the bandwidth threshold BT, the central management module preferably issues an alert message and sends it to the client management module (step 501 of FIG. 5). The client management module, upon reception of the alert message, preferably issues an info message to be shown to the user (step 502), possibly through the graphical user interface, indicating that the new service can be possibly provided with poor quality and asking the user whether she/he accepts to be provided with the new service anyway (step 503). If the user accepts (e.g. by clicking on a corresponding button of the graphical user interface of the client management module), the client management module preferably issues a confirmation message which is sent to the central management module (step 504). At this point, the central management module preferably adds a row in the QoE measurement table (step 505) with data comprising: the device ID, an information indicating the new service, an information indicating that the service is classified (namely, "yes" in the related column "Class.?" shown in Table 4 herein above) and a QoE marker indicating that the new service is a provided service notwithstanding the fact that the quality is possibly poor in terms of the actual delay. In this way, the new service entered in the QoE management table is a marked service. Then, at step 506, the central management module preferably manages the home network resources so that the new service is provided to the user's device according to the priority management procedure mentioned above which will be discussed herein after.

In any case, if the user does not accept to be provided with the new service due to the possibly poor quality, the new service is not provided to the user (steps 411 and 507).

Runtime Ordinary Management

According to the runtime management procedure, the central management module preferably manages the currently active services according to their priority values, i.e. it manages the network resources (through the gateway) to provide the active services based on their CoS values.

During runtime, the central management module preferably collects and stores the QoE measurement data that are communicated by the client management modules installed in the user devices of the home network. In particular, the user devices of the home network periodically provide QoE measurement data comprising the measured QoE, the actual bandwidth AB and the actual delay AD for each provided service. The QoE measurement data are preferably stored in the QoE measurement table. The QoE measurement table preferably stores, for each pair device/service, when the service is classified, at least N (e.g. two) values of measured QoE, actual delay AD and actual bandwidth AB.

The frequency of these measurements should always be the same and is a parameter to be carefully defined by the system administrator or by the service provider to avoid overloading the devices with unnecessary data but at the same time to allow actions to be carried out to provide the end user with a high quality of the services she/he wants to use; the inventors evaluated that an acceptable trade-off may be achieved by considering, for the measurement period, a value not exceeding one minute.

The central management module preferably periodically processes the QoE measurement data that are stored in the QoE measurement table. If the central management module detects a decay in the measured QoE for a number M of unmarked services (where M is an integer number higher than 1), the central management module preferably performs a measure indicative of an access availability to the external data network (e.g. Internet). This measure may be performed by reading this information from the gateway or by executing a specific command such as a PING to a known network server. This measure is aimed at excluding a network failure upstream of the modem (e.g. a failure in the access network, in the Internet network, in a server addressed by a service, etc.). In case the central management module detects that the external data network access is not available, the central management module preferably notifies the detected unavailability to the client management modules of the user devices of the home network by means of a message to be shown to the end user on the device's display through the graphical user interface. In this case, the central management module may also send a command to the gateway to perform an automatic reboot of the modem.

Runtime Priority Management

According to the present invention, the priority management procedure applies when the central management module determines that:

I. the available bandwidth AvB for a new service provisioning is lower that the bandwidth threshold BT; or II. the measured QoE for an unmarked service is degrading, i.e., for a giver period of time, the difference between the value of the measured QoE at time instant t and the value of the measured QoE at time instant $t+\Delta t$ is negative and below a predefined QoE threshold QT. The considered period of time may be as long as a few minutes, or it may correspond to a number of three QoE measurements.

I. Available Bandwidth Lower than the Bandwidth Threshold

When the central management module determines that the available bandwidth AvB for the provisioning of a new service is lower that the bandwidth threshold BT, it preferably implements an adaptive management procedure that will be described herein after.

Firstly, the central management module preferably compares the priority associated with the new service with the priorities of the currently active services, by using the data of the device priority table and/or the service priority table. Then, the central management module preferably performs the following actions.

If the new service is associated with a priority value (either a device priority value or a service priority value; if both values are available, the device priority value may be more important than the service priority value) lower than the priority value associated with any other provided service, the central management module sends a first alert message to the client management module installed in the user device where the new service provisioning is being requested indicating the possibility that the new service would be provided with poor quality. The client management module, upon reception of the first alert message, preferably issues a first info message to be shown to the user, through, possibly, the graphical user interface, indicating that the new service would be possibly provided with poor quality and asking the user whether she/he accepts to be provided with the new service anyway. If the user accepts (e.g. by clicking on a corresponding button of the graphical user interface of the client management module), the client management module preferably issues a confirmation message which is sent to the central management module. At this point, the central management module preferably issues a second alert message and sends it to the client management module, the second alert message indicating that the perceived quality of the new service could be poor. The client management module, in turn, preferably issues a second info message to be shown to the user through, possibly, the graphical user interface. Next, the central management module preferably provides the new service to the user device and fills-in the QoE marker field associated with this new service in the QoE management table with a value indicating that the new service is provided to the user notwithstanding the fact that the available bandwidth AvB is lower that the bandwidth threshold BT.

If the new service is associated with a priority value (either a device priority value or a service priority value) higher than the priority value associated with any other service, or the sum of the bandwidth thresholds BT associated with the services currently provided having the same or higher CoS is lower than the line data rate CS, the central management module preferably provides the new service to the user device. Then, preferably, the central management module sends notification messages to the client management modules of user devices currently providing services at lower CoS (starting from CoS value 1, until the available bandwidth is not exceeded) indicating that the perceived QoE may degrade. Finally, the central management module preferably updates the QoE marker field of these services in the QoE measurement table with a value indicating that the perceived QoE is degrading due to lack of available bandwidth.

If the sum of the bandwidth threshold BT associated with the new service and the bandwidth thresholds BT associated with the services currently provided having the same or higher CoS is higher than the line data rate CS, the central management module preferably orders these services based on the device priority value or service priority value. Then, the central management module preferably identifies, within the ordered list of services determined as described above, the services that may be provided without violating their bandwidth threshold BT. These services will be indicated herein after as "allowed services". Next, the central management module preferably downgrades the CoS of the services that are not comprised within the group of allowed services (and updates the QoE measurement table accordingly) and sends to the gateway a command message so that the gateway may implement the updated CoS for the related services. At this point, the central management module preferably issues notification messages which are sent to the client management modules of the user devices providing the services with downgraded CoS and the services having lower CoS, each notification message indicating to the user that the perceived QoE of the related service may degrade. Finally, the central management module preferably updates the QoE marker associated with the downgraded services in the QoE measurement table with a corresponding value.

II. Degradation of the QoE of an Unmarked Service

In the following lines, a different situation will be considered, namely the situation according to which the central management module, on the basis of the QoE measurement data stored in the QoE measurement table (which, as described above, can be collected at regular intervals of time, e.g. every one minute), determines that an unmarked service is experiencing a degradation in the measured QoE even if the available bandwidth AvB is higher than the sum of the bandwidths used by the services currently provided to the users of the home network (namely, the actual bandwidths reported in the QoE measurement table). It is to be noticed that in these conditions, a service can be marked only if the actual delay AD is higher that the delay threshold DT and the user decided to be provided with the service anyway.

Firstly, the central management module preferably checks whether the user device that is providing the service is currently used to provide also other concurrent services. In the affirmative, the central management module preferably cooperates with the client management module installed in the device to ask the user, through, possibly, the graphical user interface, to check whether the degradation is due to an inefficient usage of the user device's resources (e.g. CPU, memory, etc.). This check may be performed by using, for instance, the task manager of the user device, which may show the actual usage of CPU and memory. The check may also be performed in an automatic manner by getting the information from the device itself. If it is determined that the degradation is due to an inefficient usage of the device's resources, the central management module does not take any further action; in this case, indeed it's the end user that has to close some applications on her/his device.

However, if it is determined that the degradation is not due to an inefficient usage of the device's resources, an adaptive management procedure is preferably implemented. This procedure comprises modifying the CoS value of the service and monitoring the index of perceived QoE of the service and the overall index of perceived QoE to confirm or cancel the modification, as it will be described in detail herein after.

The adaptive management procedure comprises in particular the following actions.

If the service has, among the services currently provided to the user, the highest CoS value, the central management module does not take any further action. This situation may be tracked by the central management for successive/further troubleshooting analysis.

If the service has CoS value equal to the next highest value, e.g. 4, and other services have the same CoS value, the central management module preferably selects, among said other services, the service having the same CoS value with lowest priority and decrements the CoS value of this service, e.g. to 3. Then, the central management module preferably sends to the gateway a command message so that the gateway implements the possible new CoS value. Moreover, the central management module preferably issues a notification message which is sent to the client management module installed in the user device that is providing the service whose CoS has been downgraded, the notification message indicating that the perceived QoE of the service would possibly degrade. The notification message may be shown to the end user possibly through the graphical user interface. Finally, the central management module preferably updates the QoE marker associated with the downgraded service in the QoE measurement table with a corresponding value.

If, after a predefined period of time, the measured QoE of the considered service improves and the overall QoE index does not degrade, the CoS value update is confirmed. In the meantime, it is evaluated whether to downgrade other services associated with a lower priority value than the considered service, until the measured QoE of the service increases to an acceptable value (which means, for instance, a QoE index equal to or higher than three) and the overall QoE index does not degrade.

If, after the predefined period of time, the measured QoE of the considered service does not improve or the overall QoE index degrades, the central management module preferably restores the CoS value of the downgraded service to the original value. This situation is then preferably tracked for possible troubleshooting analysis.

In all other cases, the central management module preferably increments the CoS value of the considered service and the CoS value of the services that currently share the same CoS value with higher values of device or service priority. Then, the central management module preferably issues a command message which is sent to the gateway in order to implement the new classification. Moreover, the central management module preferably updates the QoE marker associated with the upgraded services in the QoE measurement table with a corresponding value.

If, after a predefined period of time, the measured QoE of the considered service improves and the overall QoE index does not degrade, the CoS value update is confirmed.

If, after the predefined period of time, the measured QoE of the considered service does not improve or the overall QoE index degrades, the central management module preferably restores the CoS value of the upgraded service(s) to the original value. This situation is then preferably tracked for possible troubleshooting analysis.

Termination of a Service

When the provisioning of a service ends (which can be determined by detecting an event of end of the service session, by detecting a lack of traffic associated with the service for a predefined period of time, or by detecting the switching off of the user device) the central management module preferably determines the amount of bandwidth currently used over the home network. If the central management module determines that the QoE measurement table comprises data indicating that one or more services are marked because the available bandwidth AvB is lower than the bandwidth threshold BT, a new check is preferably performed in order to determine whether these services still cause a violation of the bandwidth threshold BT.

In particular, the central management module preferably orders these services on the basis of the device priority value or service priority value. Then, the central management module preferably identifies those services that are within the ordered list of services determined as described above and which may be provided without violating the bandwidth threshold. Next, the central management module preferably possibly restores the CoS value of these services by sending to the gateway a command message to operate the gateway to implement the new classification. Finally, the central management module preferably removes the indication of the violation of the bandwidth threshold BT in the QoE marker field associated with these services. Optionally, the central management module may also send a notification message to the client management modules of the devices that are providing these services, so that the user may be informed about the new classification, possibly through the graphical user interface.

As apparent from the description above, the method of the present invention allows managing the home network resources in an effective way which allows avoiding degradations in the user's perceived quality of experience. Moreover, the method of the present invention allows optimizing not only the single user's satisfaction associated with a specific service, but also an overall satisfaction, which can be measured in terms of an overall QoE index.

The invention claimed is:

1. A method for managing the resources of a first communication network connecting one or more user devices, said user devices being connected to a gateway, said gateway being connected to at least one service provider via a second communication network, the method comprising:
   providing a central management module cooperating with said gateway and, by said central management module:
   storing first priority values associated with one or more types of said user devices, each type of user device being associated with one or more services that may be provided by said type of user device;
   for each of said user devices, identifying one or more services provided by said device and storing a respective second priority value for each provided service;
   for each provided service, calculating a class of service (CoS) value based on said first priority values or said second priority values;
   providing a client management module to be installed in each of said user devices, the client management module configured to provide quality of experience (QoE) data for one or more services,
   wherein the method further comprises:
   by said client management module, operating said user device to provide measurement data of a perceived quality of experience associated with each service provided to the user by said user device; and
   by said central management module, managing said resources by processing the following information:
   said measurement data of a perceived quality of experience; and
   said CoS values.

2. The method according to claim 1, wherein said measurement data associated to a service comprise a measured quality of experience comprising an index of perceived quality of experience and an actual delay.

3. The method according to claim 2, wherein said central management module stores a list of service types and, for each service type, a bandwidth threshold indicating a minimum bandwidth that is required to run the service and/or a delay threshold indicating a maximum acceptable delay.

4. The method according to claim 3, wherein it further comprises, when said user is requesting a service from one of said user devices, checking, by said central management module, whether an available bandwidth is higher than said bandwidth threshold for the requested service and whether said actual delay is lower than said delay threshold for said requested service.

5. The method according to claim 4, further comprising, in case said requested service is associated with any of a first priority value or a second priority value:

if said checking is positive, managing said resources to provide said requested service based on said CoS value associated with said requested service; and if said actual delay is higher than said delay threshold and said available bandwidth is higher than said bandwidth threshold informing the user that the requested service can be provided with possibly poor quality and, in case the user accepts to be provided with said requested service, managing said resources to provide said requested service based on said CoS value associated with said requested service, and storing a QoE marker associated with said requested service, the QoE marker indicating that said requested service is provided upon the user's request despite the fact that said actual delay is higher than said delay threshold;

if said available bandwidth is lower than said bandwidth threshold implementing an adaptive management procedure for managing said resources; and if said actual delay is higher than said delay threshold and said available bandwidth is lower than said bandwidth threshold informing the user that the requested service can be provided with possibly poor quality and, in case the user accepts to be provided with said requested service, implementing said adaptive management procedure for managing said resources, and storing a QoE marker associated with said requested service, the QoE marker indicating that said requested service is provided upon the user's request despite the fact that said actual delay is higher than said delay threshold and said available bandwidth is lower than said bandwidth threshold.

6. The method according to claim 5, wherein said adaptive management procedure comprises:

comparing the priority associated with the requested service with the priorities of currently active services;

if the requested service is associated with a priority value lower than the priority value associated with any other currently active service, informing the user that the requested service can be provided with possibly poor quality and, in case the user accepts to be provided with said requested service, managing said resources to provide said requested service based on said CoS value associated with said requested service and storing a QoE marker associated with said requested service, the QoE marker indicating that said requested service is provided upon the user's request despite the fact that said available bandwidth is lower that the bandwidth threshold;

if the requested service is associated with a priority value higher than the priority value associated with any other currently active service, or the sum of the bandwidth thresholds associated with currently active services having a same or higher CoS value is lower than a line data rate of said gateway, managing said resources to provide said requested service based on said CoS value associated with said requested service, and informing the users of currently active services having a lower CoS value that a perceived quality of experience may degrade;

if the sum of the bandwidth threshold associated with the requested service and the bandwidth thresholds associated with currently active services having a same or higher CoS value is higher than said line data rate: ordering said services based on said first priority value or said second priority value; identifying, within said ordered services, allowed services that may be provided without violating said bandwidth threshold; downgrading the CoS values of the services that are not comprised within said allowed services; informing the users of currently active services having a lower CoS and of said services not comprised within said allowed services value that a perceived quality of experience may degrade; and storing a QoE marker associated with said services that are not comprised within said allowed services, said QoE marker indicating that said services are downgraded.

7. The method according to claim 4, wherein it further comprises, in case said requested service is not associated with any of a first priority value or a second priority value:

if said checking is positive, managing said resource to provide said requested service in a best effort mode; and if said checking is negative, informing the user that the requested service can be provided with possibly poor quality and, in case the user accepts to be provided with said requested service, managing said resources to provide said requested service in a best effort mode and storing a QoE marker associated with said requested service, the QoE marker indicating that said requested service is provided upon the user's request despite the fact that said checking is negative.

8. The method according to claim 2, further comprising calculating an overall index of perceived quality as a weighted average of the indexes of perceived quality of experience of currently active services.

9. The method according to claim 2, further comprising:

calculating an overall index of perceived quality as a weighted average of the indexes of perceived quality of experience of currently active services;

when said user is requesting a service from one of said user devices, checking, by said central management module, whether an available bandwidth is higher than said bandwidth threshold for the requested service and whether said actual delay is lower than said delay threshold for said requested service; and for a service whose actual delay is lower than said delay threshold and when said available bandwidth is higher than a sum of actual bandwidths of the currently active services, checking, by said central management module, whether, on the basis of said measurement data of a perceived quality of experience, said service is experiencing a degradation in the measured quality of experience and, in case said checking is positive, modifying the CoS value of said service and monitoring the index of perceived quality of experience of said service and said overall index of perceived quality of experience to confirm or cancel said modification.

10. A system for managing the resources of a first communication network, the system comprising:

one or more user devices interconnected by the first communication network;

a gateway connected to the one or more user devices via the first communication network, said gateway being connected to at least one service provider via a second communication network, a central management module cooperating with said gateway, said central management module being configured to:

store first priority values associated with one or more types of said user devices, each type of user device being associated with one or more services that may be provided by said type of user device;

for each of said user devices, identify one or more services provided by said device and storing a respective second priority value for each provided service;

for each provided service, calculate a class of service (CoS) value based on said first priority values or said second priority values;

provide a client management module to be installed in each of said user devices and configured to operate said user device to provide measurement data of a perceived quality of experience associated with each service provided to the user by means of said user device; and manage said resources by processing the following information:

said measurement data of a perceived quality of experience; and said CoS values.

\* \* \* \* \*